United States Patent [19]

Hayashi et al.

[11] Patent Number: 5,683,489
[45] Date of Patent: Nov. 4, 1997

[54] METHOD OF PRODUCING IRON CARBIDE

[75] Inventors: Shoji Hayashi, 8-2, Okudakeiyocho, Inazawa-shi, Aichi-ken; Yoshiaki Iguchi, 5-7, Ishiodai 6-chome, Kasugai-shi, Aichi-ken; Yukihiro Hida; Satoshi Sawai, both of Futtsu, all of Japan

[73] Assignees: Shoji Hayashi, Inazawa; Yoshiaki Iguchi, Kasugai; Kabushiki Kaisha Kobe Seiko Sho, Kobe, all of Japan

[21] Appl. No.: 588,310

[22] Filed: Jan. 18, 1996

[30] Foreign Application Priority Data

Jan. 20, 1995 [JP] Japan ............................ 7-007079

[51] Int. Cl.$^6$ .............................. C22B 5/14; C01B 31/30
[52] U.S. Cl. ............................ 75/505; 75/444; 423/439
[58] Field of Search ........................ 423/439; 75/444, 75/450, 451, 505

[56] References Cited

U.S. PATENT DOCUMENTS 5,137,566  8/1992  Stephens, Jr. ...................... 423/439

FOREIGN PATENT DOCUMENTS 58-11484  3/1983  Japan .
6-37658   5/1994  Japan .

OTHER PUBLICATIONS

ISIJ International, vol. 32, No. 9, pp. 961–971, Sep. 1992, Shoji Hayashi, et al., "Factors Affecting the Sticking of Fine Iron Ores During Fluidized Bed Reduction".

*Primary Examiner*—Melvyn Andrews
*Attorney, Agent, or Firm*—Oblon, Spivak, McClelland, Maier & Neustadt, P.C.

[57] ABSTRACT

A method for producing iron carbide by bringing iron ore into contact with a reducing gas containing hydrogen and a carbon compound at a specified reaction temperature to reduce and carburize the iron ore with the participation of a sulfur component, the method includes measuring the reaction temperature, partial pressure $P(H_2)$ of the hydrogen and partial pressure $P(H_2S)$ of hydrogen sulfide contained in the reducing gas, calculating sulfur activity as in the reducing gas from equation (1) shown below, and adjusting the partial pressure $P(H_2S)$ of the hydrogen sulfide in the reducing gas to obtain as=1.0 to 2.0. at reaction temperatures of 550° C. and above but less than 650° C., as=0.7 to 2.0 at 650° C., and as=0.05 to 1.0 at over 650° C. and up to 950° C.:

$$as = (P(H_2S)/P(H_2))/(P(H_2S)/P(H_2))E \quad (1)$$

where $(P(H_2S)/P(H_2))$ represents the ratio between the partial pressures of $H_2S$ and $H_2$ in the reducing gas and $(P(H_2S)/p(H_2))s$ is the ratio between the partial pressures of $H_2S$ and $H_2$ in a condition where the reaction of equation (2) below is in equilibrium:

$$FeS(s)+H_2(g)=Fe(s)+H_2S(g) \quad (2)$$

where (s) and (g) represent solid and gaseous phases, respectively.

2 Claims, 2 Drawing Sheets

METHOD OF PRODUCING IRON CARBIDE

BACKGROUND OF THE INVENTION

This invention relates to a direct iron making technology which utilizes a shaft furnace or a fluidized bed furnace, more particularly, to a method for producing iron carbide ($Fe_xC_y$, $x/y=2$ to 3) from iron ore efficiently.

Iron carbide has been attracting considerable attention in recent years as a new, high-quality crude material capable of realizing a new generation of energy-saving iron making technology which produces a smaller amount of carbon dioxide gas. There have been known some methods for producing iron carbide. These include a Stelling method disclosed in U.S. Pat. No. 2,780,537 in which pulverized iron ore is brought into contact with gas containing carbon monoxide (CO) at a temperature between 400° C. and 900° C., and an iron carbide method disclosed in U.S. Pat. No. 4,053,301 in which iron ore is reduced by $H_2$ gas at a temperature between 595° C. and 705° C. on a fluidized bed and carburized by a carbon-containing substance at the same time.

In high-temperature fluidized bed operation, metallic iron produced in a furnace is liable to exhibit the sticking phenomenon, making it difficult to ensure stable operation. An undesirable phenomenon that is liable to occur in producing sponge iron or iron carbide is clogging of pipes by free carbon, or soot, caused by precipitation from CO and $CH_4$ contents of a reducing gas. Another undesirable phenomenon is brittle fracture of a reactor vessel, for example, due to carburizing treatment. To overcome these problems, iron producers limit their treatment temperatures into the lower ranges or operate their furnaces in such a condition that the density of carburizing gases such as CO and $CH_4$ is slightly higher than a density at which equilibrium is attained in an $Fe/Fe_3C$ mixture.

Japanese Examined Patent Publication No. 6-37658 discloses a method for preventing the sticking phenomenon in iron ore reducing operation on a fluidized bed by causing the surface of produced metallic iron to chemically adsorb or combine with sulfur. However, this document does not disclose production of iron carbide.

Also, Japanese Examined Patent Publication No. 44-14462 discloses a method for suppressing conversion of CO to free carbon and to carbon that reacts with iron in a process of sponge iron production. In this method, specifically, 1 to 1000 ppm by volume of sulfur compounds is added to the reducing gas within a temperature range of 426° C. to 816° C.

However, manufacturing productivity of the aforementioned iron carbide producing methods is extremely low. This is because iron carbide is produced at relatively low treatment temperatures and with a carburizing gas composition very close to the state of $Fe/Fe_3C$ equilibrium, resulting in a slow reaction speed.

Furthermore, there is very limited knowledge of how sulfur compounds contained in a reacting gas affect iron carbide production.

SUMMARY OF THE INVENTION

It is an object of the present invention to provide a method for producing iron carbide which has overcome the problems residing in the prior art.

It is another object of the present invention to provide a method for producing iron carbide which can produce iron carbide more efficiently by suppressing precipitation of free carbon (soot) and decomposition of iron carbide.

The present invention is directed to a method for producing iron carbide by bringing iron ore into contact with a reducing gas containing hydrogen and a carbon compound at a specified reaction temperature to reduce and carburize the iron ore; and the activity as of sulfur contained in the reducing gas being controlled in accordance with a reaction temperature to cause iron carbide to adsorb sulfur on a surface of the iron carbide.

The sulfur activity as may be preferably controlled by measuring a partial pressure $P(H_2)$ of hydrogen and a partial pressure $P(H_2S)$ of hydrogen sulfide contained in the reducing gas; calculating sulfur activity $a_s$ in the reducing gas from equation (1), $$a_s = (P(H_2S)/P(H_2))/(P(H_2S)/P(H_2))E \qquad (1)$$

where $(P(H_2S)/P(H_2))$ represents the ratio between the partial pressures of $H_2S$ and $H_2$ in the reducing gas and $(P(H_2S)/P(H_2))E$ is the ratio between the partial pressures of $H_2S$ and $H_2$ in a condition where the reaction of equation (2) below is in equilibrium, $$FeS(s) + H_2(g) = Fe(s) + H_2S(g) \qquad (2)$$

where (s) and (g) represent solid and gaseous phases, respectively; and adjusting the partial pressure $P(H_2S)$ of the hydrogen sulfide in the reducing gas.

It may be preferable to set the sulfur activity as: at 1.0 to 2.0 at reaction temperatures of 550° C. and above but less than 650° C.; at 0.7 to 2.0 at 650° C.; at 0.05 to 1.0 at over 650° C. and up to 950° C.

In these methods, the sulfur activity as is controlled in accordance with a reaction temperature to cause iron carbide to adsorb sulfur on a surface of the produced iron carbide. Accordingly, it is possible to suppress precipitation of free carbon and decomposition of iron carbide, thus realizing stable production of iron carbide and improvement in manufacturing productivity even in conditions of higher temperatures and higher partial pressures of CO and $CH_4$ than in the conventional methods.

The sulfur activity as is controlled by measuring a partial pressure $P(H_2)$ of hydrogen and a partial pressure $P(H_2S)$ of hydrogen sulfide contained in the reducing gas, calculating sulfur activity as in the reducing gas, and adjusting the partial pressure $P(H_2S)$ of the hydrogen sulfide in the reducing gas. This will provide more reliable control of sulfur activity $a_s$.

Other objects, features and advantages of the invention will be understood upon reading the detailed description of the invention to follow in conjunction with the accompanying drawings.

DETAILED DESCRIPTION OF THE INVENTION

Figure 1:
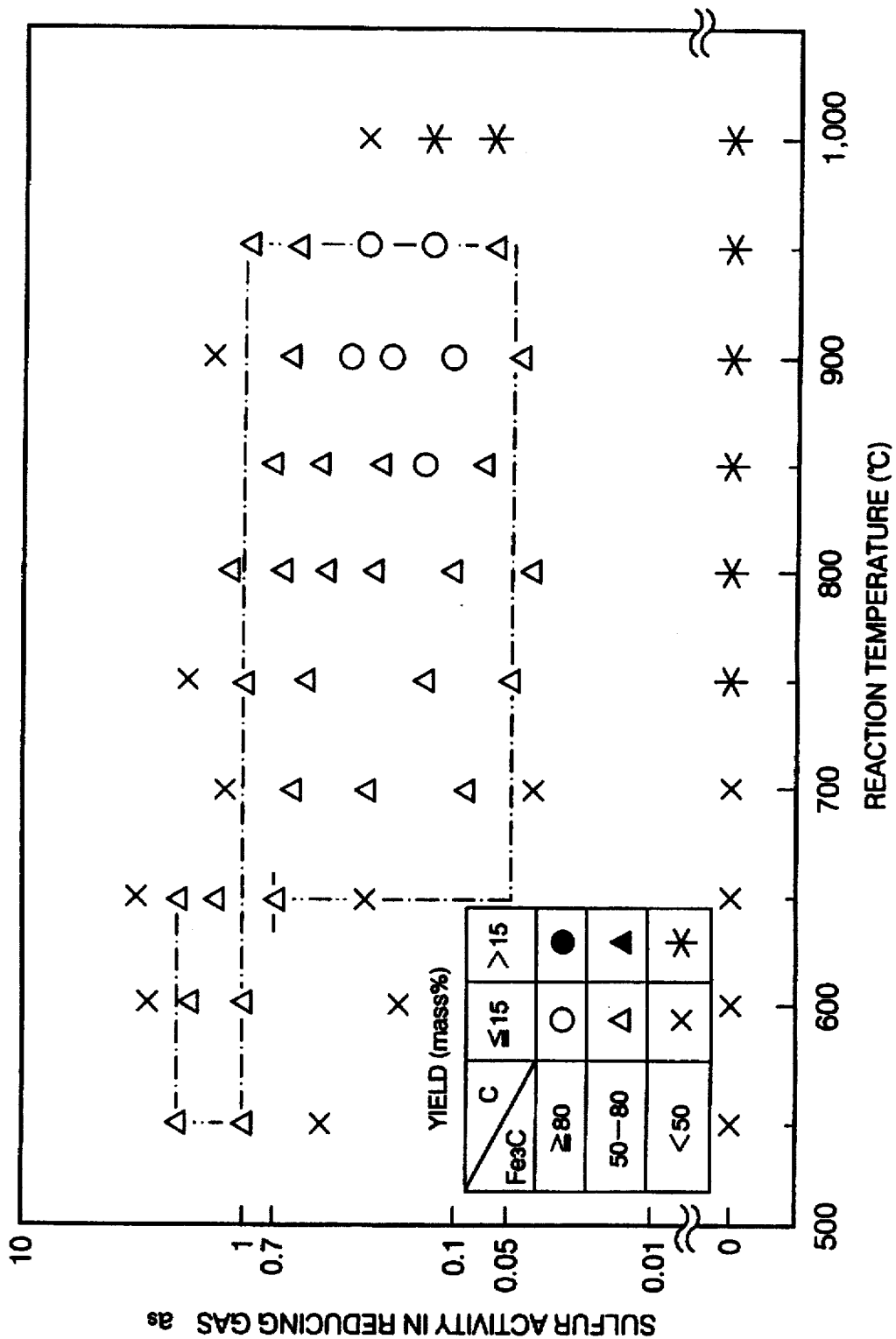
FIG. 1 is a diagram showing preferable and optimum areas obtained when an iron ore is reacted with a $CH_4$—$H_2$—$H_2S$ gas mixture at different levels of sulfur activity.

The present invention is based on the inventor's discovery that it is possible to suppress precipitation of free carbon without hindering iron carbide production and to prevent decomposition of the produced iron carbide by adjusting the activity as of sulfur contained in a reducing gas that contains hydrogen and a carbon compound and by causing the iron carbide to adsorb sulfur on its surface. Described below is how the production of iron carbide is accelerated by hydrogen sulfide and how numerical limits of sulfur activity $a_s$ of the present invention were determined based on the results of experiments using boats.

According to the invention, hydrocarbon gas (e.g., $CH_4$-$H_2$) which is a main component of natural gas or synthetically generated gas (e.g., $CO$—$H_2$) is used in producing iron carbide as a reducing gas which basically contains hydrogen and a carbon compound. Used as a raw iron source is such iron ore as hematite, magnetite or limonite, for instance. Iron oxide contained in the iron ore is converted to magnetite $Fe_3O_4$, wustite FeO and reduced iron Fe and eventually becomes iron carbide $Fe_3C$ through reactions expressed by equations (3) to (6) below, in which (s) and (g) represent solid and gaseous phases, respectively:

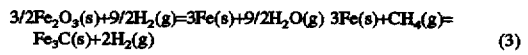

$$3/2Fe_2O_3(s)+9/2H_2(g)=3Fe(s)+9/2H_2O(g)\ 3Fe(s)+CH_4(g)=Fe_3C(s)+2H_2(g) \quad (3)$$

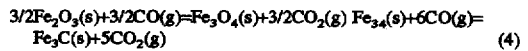

$$3/2Fe_2O_3(s)+3/2CO(g)=Fe_3O_4(s)+3/2CO_2(g)\ Fe_{3.4}(s)+6CO(g)=Fe_3C(s)+5CO_2(g) \quad (4)$$

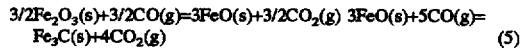

$$3/2Fe_2O_3(s)+3/2CO(g)=3FeO(s)+3/2CO_2(g)\ 3FeO(s)+5CO(g)=Fe_3C(s)+4CO_2(g) \quad (5)$$

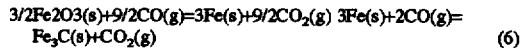

$$3/2Fe2O3(s)+9/2CO(g)=3Fe(s)+9/2CO_2(g)\ 3Fe(s)+2CO(g)=Fe_3C(s)+CO_2(g) \quad (6)$$

In certain conditions, $Fe_{2.5}C$ and $Fe_2C$ are also produced in addition to $Fe_3C$. Iron carbide is the generic name for various iron-carbon compounds expressed by $Fe_xC_y$ (x/y=2 to 3). Each of the above reactions comprises a plurality of elementary reactions. For example, the reactions of equation pair (6) are believed to include CO-related elementary reactions as expressed by equations (7) and (8) below:

$$2CO(g)+\square Fe^C=C(ad)+CO_2(g) \quad (7)$$

$$C(ad)+3Fe(s)=Fe_3C(s)+\square Fe^C \quad (8)$$

Free carbon precipitates as a result of a side reaction expressed by equation (9) below:

$$C(ad)+\square Fe^S=C(graphite) \quad (9)$$

In equations (7) to (9), (ad), (graphite), $\square Fe^C$ and $\square FE^S$ represent adsorption to the surface of metallic iron, free carbon (soot), secondary adsorption sites for carbon atoms and those for sulfide ion species on the surface of metallic iron, respectively. Since the diameter of a carbon atom is much smaller than that of a sulfide ion, there are more than twice as many secondary adsorption sites $\square Fe^C$ for carbon atoms as secondary adsorption sites $\square Fe^S$ for sulfide ions. It is therefore apparent that there still remain a considerable number of adsorption sites $\square Fe^C$ even after sulfide ions have been completely adsorbed to the surface of iron.

Iron ore and coal which is a raw material adapted for producing a reducing gas both contain sulfur compounds in the form of iron sulfides or organic compounds. It is known that a part of these sulfur compounds pass into a gaseous phase in the form of hydrogen sulfide $H_2S$ if the reducing gas contains hydrogen. Recent studies have revealed that hydrogen sulfide has considerable effects on the characteristics of metallic iron produced by a reducing process. These effects of hydrogen sulfide are affected by partial pressures and temperature of the reducing gas. Having studied the reaction process, it has been found that the influence of partial pressures and temperature can be generally understood as the function of the activity as of sulfur contained in the reducing gas, where the sulfur activity as is expressed by equation (1) below:

$$a_s=(P(H_2S)/P(H_2))/(P(H_2S)/P(H_2))E \quad (1)$$

As already mentioned, $(P(H_2S)/P(H_2))$ in equation (1) represents the ratio between the partial pressures of $H_2S$ and $H_2$ in the reducing gas and $(P(H_2S)/P(H_2))s$ is the ratio between the partial pressures of $H_2S$ and $H_2$ in a condition where the reaction of equation (2) below is in equilibrium:

$$FeS(s)+H_2(g)=Fe(s)+H_2S(g) \quad (2)$$

Table 1 shows values of $(P(H_2S)/P(H_2))s$ in volume ppm calculated from standard free energy changes in the reaction of equation (2) for a temperature range of 500° C. to 1000° C. It is understood from Table 1 that the higher the reaction temperature, the larger the value of $(P(H_2S)/P(H_2))E$.

TABLE 1

| Temperature (°C.) | 500 | 600 | 700 | 800 | 900 | 1000 |
|---|---|---|---|---|---|---|
| $(P(H_2S)/P(H_2))_E$ (volume ppm) | 105 | 360 | 940 | 2100 | 3900 | 5830 |

It is widely known that sulfur existing in a high-temperature reducing atmosphere is completely adsorbed on the surface of iron in accordance with equation (10) even where the activity $a_s$ of sulfur contained in the reducing gas is as low as 0.1 because sulfur is an extremely surface-active element.

$$H_2-S(g)+\square Fe^S=S(ad)+H_2(g) \quad (10)$$

This means that if there exist a certain amount of hydrogen sulfide $H_2S$, sulfur fills the majority of adsorption sites $\square Fe^S$ leaving few unfilled adsorption sites $\square Fe^S$. As a result, rapid precipitation of free carbon caused by the forward reaction of equation (9) is suppressed. In the forward reactions of equations (7) and (8), iron carbide is continuously produced, but precipitation of free carbon (C(graphite)) is suppressed since there exist a sufficient number of carbon atom adsorption sites $\square Fe^C$.

Furthermore, in a condition where chemical adsorption of sulfur to the surface of reduced iron occurs, iron produced through the reduction of iron oxide has a porous structure. This porosity increases the specific surface area of the reduced iron, serving to accelerate the forward reactions of equations (7) and (8). Described above is how hydrogen sulfide $H_2S$ accelerates the production of iron carbide.

Next, the invention will now be described in further detail with reference to results of experiments carried out by using five types of iron ore. They each are in the form of particles of 0.5 mm or less in diameter and their chemical composition (mass %) is shown in Table 2.

TABLE 2

| Iron ore | Fe | FeO | SiO$_2$ | Al$_2$O$_3$ | CaO | S |
|---|---|---|---|---|---|---|
| A | 68.23 | 0.42 | 0.89 | 0.43 | 0.01 | 0.003 |
| B | 62.38 | 0.07 | 4.47 | 2.63 | 0.04 | 0.009 |
| C | 68.10 | 0.13 | 0.94 | 0.51 | 0.04 | 0.002 |
| D | 69.13 | 0.14 | 0.47 | 0.76 | 0.01 | 0.001 |
| E | 57.20 | 0.13 | 5.68 | 2.77 | 0.10 | 0.024 |

First, an experiment was carried out by using boats. In carrying out the experiment, a boat loaded with a specified amount of iron ore A was inserted into a horizontal reactor tube measuring 22 mm in inside diameter.

Iron ore A was reduced and carburized by reacting it under atmospheric pressure and at temperatures between 550° C. and 1000° C. with specified mixtures of H$_2$ and CH$_4$ gases as well as those H$_2$ and CO gases. For comparative testing, these gases were blown into the reactor tube at different ratios.

Specifically, the CH$_4$-H$_2$ mixtures were made by supplying (1) either of H$_2$ and CH4 at 200 cm$^3$/minute, (2) H$_2$ at 200 cm$^3$/minute and CH$_4$ at 100 cm$^3$/minute, and (3) H$_2$ at 200 cm$^3$/minute and CH$_4$ at 50 cm$^3$/minute. The CO—H$_2$ mixtures were made by supplying (1) either of H$_2$ and CO at 200 cm$^3$/minute, and (2) H$_2$ at 200 cm$^3$/minute and CO at 50 cm$^3$/minute. The sulfur activity as in each type of reducing gas was adjusted by adding 2 vol % H$_2$S-98 vol % H$_2$ gas mixture into the input gases. An X-ray diffraction analysis proved the existence of iron carbide (mainly Fe$_3$C), free carbon C, metallic iron Fe and wustite FeO.

Figure 2:
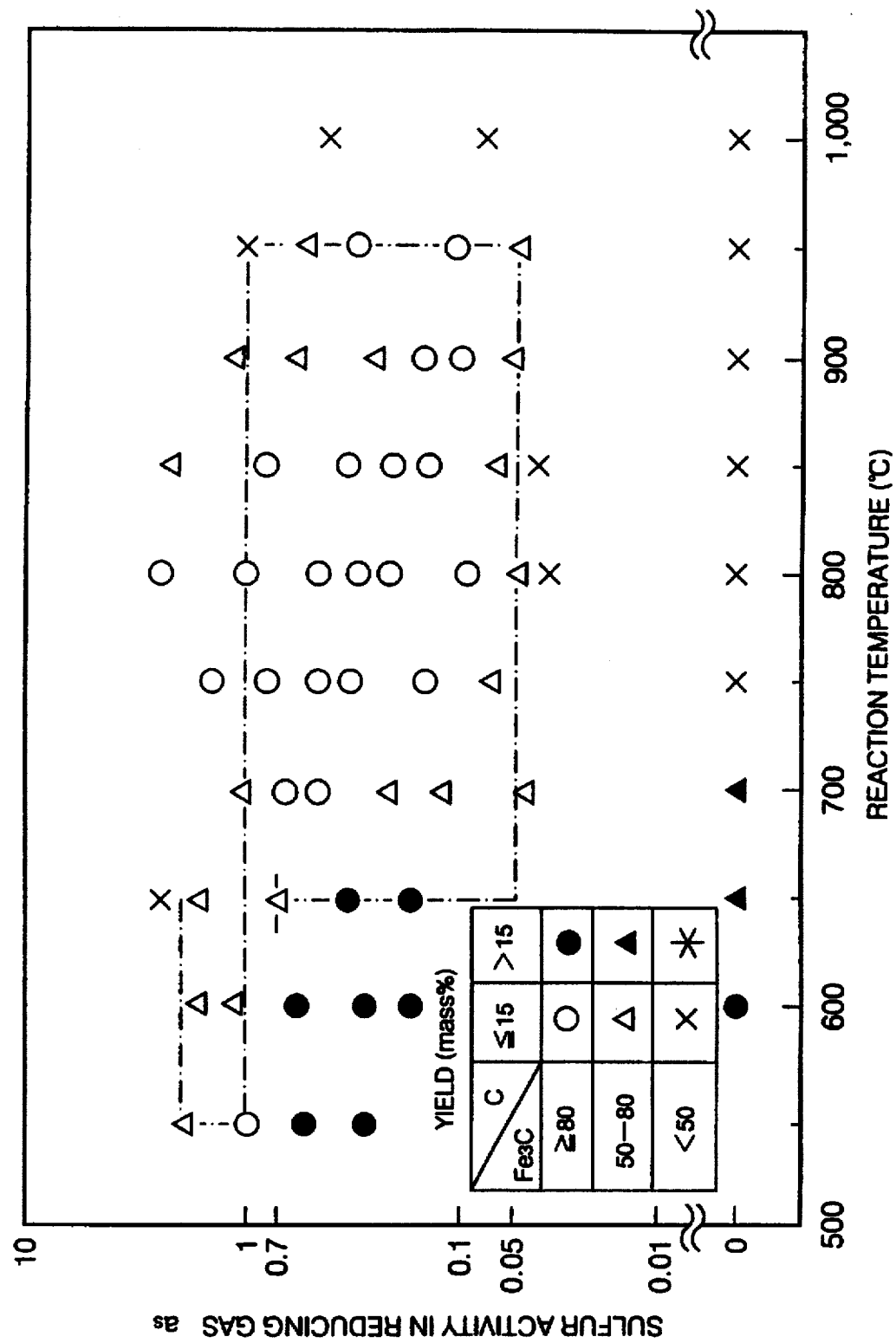
FIG. 2 is a diagram showing preferable and optimum areas obtained when an iron ore is reacted with a CO—$H_2$—$H_2S$ gas mixture at different levels of sulfur activity.

To evaluate yields of individual reaction processes, densities (mass %) of these substances were calculated from measured diffraction intensities, in which 100 mass % equals to the total amount of the four substances. Here, the yield of iron carbide Fe$_{2-3}$C is defined as "the ratio of the mass of iron converted to iron carbide to the total mass of iron contained in a product expressed by mass percent." A product containing large amounts of metallic iron and free carbon is difficult to handle as it is apt to produce dust or ignite. Also, a product having a low reducing rate requires excessive energy for reduction. For quantitative assessment of the reaction processes, we defined the following two conditions:

(a) "Preferable condition"- - - This is a condition which provides a maximum iron carbide yield between 50 and 80 mass % and the density of free carbon is 15 mass % or less when the maximum iron carbide yield is achieved, (Such conditions are shown by open triangles "Δ" in FIGS. 1 and 2.)

(b) "Optimum condition" - - - This is a condition which provides a maximum iron carbide yield of 80 mass % or over and the density of free carbon is 15 mass % or less when the maximum iron carbide yield is achieved. (Such conditions are shown by open circles "○" in FIGS. 1 and 2.)

Now, the experimental results are described in detail. FIGS. 1 and 2 are diagrams showing the grading of maximum iron carbide yields (mass %) and free carbon densities (mass %) obtained when specimens of iron ore A were reacted with different CH$_4$-H$_2$-H$_2$S mixtures and CO-H$_2$-H$_2$S mixtures, respectively, for one hour at different temperatures and sulfur activities. At reaction temperatures over 650° C. and up to 950° C., the maximum iron carbide yield remained under 50 mass % when a$_s$<0.05 regardless of the mixed gas composition (as shown by "x" and "✗" in FIGS. 1 and 2). Although products shown by "Δ" and "○" were obtained when a$_s$>1.0, these products were considered undesirable because they included a noxious iron sulfide. At 1000° C., the iron carbide yield did not exceed 40 mass % which corresponds to the saturated carbon density of the austenite phase (γ iron) which is stable in the above temperature range.

At reaction temperatures between 550° C. and 650° C., it was required to increase the activity as of sulfur contained in reducing gases than at reaction temperatures over 700° C. in order to suppress carbon precipitation. This was because carbon could easily precipitate even under a low partial pressure of CO as suggested by the theory of equilibrium. The iron carbide yield exceeded 50 mass % when a$_s$<1.0 at 550° C. and above but less than 650° C. and when a$_s$<0.7 at 650° C. However, the free carbon density exceeded 15 mass % (as shown by "●" and "▲" in FIGS. 1 and 2) and extraordinary degradation and swelling (10 to 50 times in volume) were observed in either case. When a$_s$>2.0, harmful sulfur content in products exceeded 0.2 mass %. At reaction temperatures below 550° C., it required 10 hours to achieve maximum iron carbide yield, and this was unacceptable.

Referring to FIGS. 1 and 2, products marked by "○" and "Δ" were obtained in areas enclosed by dot-and-dash lines. It can be recognized from FIGS. 1 and 2 that a desirable range of sulfur activity is 1.0≦a$_s$≦2.0 at 550° C. and above but less than 650° C., 0.7≦a$_s$≦2.0 at 650° C., and 0.05≦a$_s$≦1.0 at over 650° C. and up to 950° C. These conditions provided products with low sulfur contents of 0.2 mass % or less. Particularly at reaction temperatures over 650° C., the product quality was remarkably excellent with a sulfur content of 0.03 mass % or less. It has therefore been found that reaction temperatures over 650° C. and up to 950° C. and a sulfur activity range of 0.05≦a$_s$≦1.0 provide most desirable conditions.

Next, iron carbides were produced by using 1.4 tons each of iron ores B to E shown in Table 2. Each iron ore screened into particles of 0.5 mm or less in diameter was fed into a vertical batch fluidized bed furnace measuring 2.0 m in inside diameter, and a reducing gas was blown through the furnace at a flow velocity of 1 m/sec. under atmospheric pressure.

Table 3 shows conditions of production manners of the inventive method and those of production manner of the conventional method. Table 4 shows results of individual production manners. Mass percentages of individual substances in each product were determined by the X-ray diffractometry.

TABLE 3

| Run No. | Iron ore | Reaction temperature (°C.) | Composition of input gas mixture (vol %) | | | | | | a$_s$ | Reaction time (h) |
|---|---|---|---|---|---|---|---|---|---|---|
| | | | H$_2$ | CO | CH$_4$ | CO$_2$ | N$_2$ | H$_2$S H$_2$ ppm | | |
| F-7 | B | 550 | 67 | 33 | 0 | 0 | 0 | 420 | 2.1 | 2.5 |
| F-1 | B | 600 | 50 | 0 | 50 | 0 | 0 | 420 | 1.2 | 3.0 |
| F-12 | E | 650 | 67 | 33 | 0 | 0 | 0 | 420 | 0.71 | 1.5 |
| F-2 | D | 650 | 67 | 0 | 33 | 0 | 0 | 420 | 0.71 | 2.5 |

TABLE 3-continued

| Run No. | Iron ore | Reaction temperature (°C.) | Composition of input gas mixture (vol %) | | | | | | $a_s$ | Reaction time (h) |
|---|---|---|---|---|---|---|---|---|---|---|
| | | | $H_2$ | CO | $CH_4$ | $CO_2$ | $N_2$ | $H_2SH_2$ ppm | | |
| F-3 | B | 700 | 50 | 50 | 0 | 0 | 0 | 420 | 0.45 | 1.5 |
| F-20 | B | 700 | 50 | 0 | 50 | 0 | 0 | 420 | 0.45 | 2.0 |
| F-18 | B | 700 | 50 | 25 | 20 | 5 | 0 | 420 | 0.45 | 2.0 |
| F-30 | B | 750 | 50 | 50 | 0 | 0 | 0 | 110 | 0.075 | 1.5 |
| F-5 | C | 750 | 50 | 50 | 0 | 0 | 0 | 420 | 0.30 | 1.5 |
| F-27 | E | 750 | 50 | 50 | 0 | 0 | 0 | 110 | 0.075 | 1.5 |
| F-15 | E | 800 | 50 | 50 | 0 | 0 | 0 | 420 | 0.20 | 1.0 |
| F-26 | D | 800 | 50 | 50 | 0 | 0 | 0 | 110 | 0.050 | 1.0 |
| Conventional method | | 600 | 60 | 5 | 25 | 5 | 5 | 20 | 0.056 | 16 |

TABLE 4

| Run No. | Iron ore | Composition of product (mass %) | | |
|---|---|---|---|---|
| | | Iron carbide yield | Free carbon content | Sulfur content |
| F-7 | B | 95* | 5 | 0.144 |
| F-1 | B | 95* | 5 | 0.202 |
| F-12 | E | 100* | 5 | 0.257 |
| F-2 | D | 95 | 10 | 0.134 |
| F-3 | B | 93 | 4 | 0.095 |
| F-20 | B | 90 | 5 | 0.095 |
| F-18 | B | 92 | 3 | 0.095 |
| F-30 | B | 100* | 5 | 0.042 |
| F-5 | C | 100 | 6 | 0.088 |
| F-27 | E | 100 | 10 | 0.064 |
| F-15 | E | 96 | 7 | 0.076 |
| F-26 | D | 87 | 9 | 0.020 |
| Conventional method | | 85 | 12 | 0.006 |

Note: Figures denoted by asterisks (*) show total mass percentages of $Fe_3C$, $Fe_{2.5}C$ and $Fe_2C$.

The value of $P(H_2S)/P(H_2)$ in each production manners was determined by analyzing exhaust gases and the sulfur activity $a_s$ in each reducing gas was calculated from equation (1) using this value and reaction temperature. The sulfur activity as was then adjusted by adding limestone or $H_2S$ to each input gas in accordance with the calculated value of sulfur activity as.

With run No. F-15, for instance, 6 kg of limestone was added for each 1000 m³ of reducing gas when $a_s$=1.5($P(H_2S)$/$P(H_2)$)=3.2×10⁻³). On the contrary, 0.19 m³ of $H_2S$ was added for each 1000 m³ of reducing gas when $a_s$=0.020($P(H_2S)/P(H_2)$=4.2×10⁻⁵). As a result of this adjustment, $a_s$=0.20($P(H_2S)/P(H_2)$=4.2×10⁻⁴) was obtained in each case.

In practice, the above adjustment of sulfur activity can be made in different ways. If raw iron ore has a sufficiently low density of sulfur, the sulfur activity in the reducing gas may be adjusted based on partial pressures of $H_2S$ and $H_2$ contained in the input gas. If the sulfur activity in the reducing gas is lower than a specified value, it can be increased by adding at least one of the following substances: thiol (—SH), sulfide (—S—), disulfide (—S₂—), thiophen (—CSH) or thiocyanogen (—CSN) contained in petroleum or coal, $CS_2$, $H_2S_2$, $(NH_4)_2S$ or any other sulfur compound which produces $H_2S$ in an atmosphere containing hydrogen, or $H_2S$.

Generally speaking, it is desirable to add materials containing these substances, e.g., heavy oil or coal before desulfurization, gases obtained by cracking such heavy oil or coal, iron ore having a high sulfur content and iron-containing dust if it is necessary to increase the sulfur activity. On the contrary, the sulfur activity in the reducing gas can be decreased by adding a desulfurizing agent such as CaO, $CaCO_3$, $Ca(OH)_2$, dolomite or fluorite, for instance.

As shown in Tables 3 and 4, it was possible to convert more than 87 mass % of the whole iron content of each iron ore into iron carbide within 1.0 to 3.0 hours in the inventive method while the conventional method required 16 hours to achieve the same level of iron carbide yield. Furthermore, the inventive method provided high-quality iron carbide products with free carbon contents of 15 mass % or less. Since the conventional method utilized a gas containing twice as a larger amount of hydrogen gas as hydrocarbon gas, it was not possible to suppress the iron carbide decomposing reaction caused by hydrogen gas during production and by the adsorption of hydrogen after production. In the inventive method, however, decomposition of iron carbide was effectively suppressed by the adsorption of sulfur to the surface of iron carbide or by iron sulfide. Yet, residual sulfur contents of the resultant iron carbide products did not exceed 0.26 mass %.

Particularly at reaction temperatures of 700° C. and above, the iron carbide yield exceeded 87 mass % within two hours, resulting in an 8 times or higher increase in productivity compared to the conventional method. Moreover, the sulfur content in each product never exceeded 0.1 mass % at those temperatures. The above-described test results have proved that the inventive method works satisfactorily regardless of iron ore types and gas composition (CO, $CH_4$, $CO_2$ and $H_2$). Further testing has proved that the inventive method is also effective for use in other types of reaction furnaces including a shaft furnace and a fixed bed furnace. When applied to a circulating fluidized bed operation, the inventive method further improved the productivity by 50%.

Further, it will be seen that in the inventive method, iron carbide or a small amount of free carbon helped maintain fluidization on the bed even when $a_s$=0.05, that is, a condition where the sticking phenomenon was very likely to occur. This assures stable operation.

What is claimed is:

1. A method for producing iron carbide comprising:
   bringing iron ore into contact with a reducing gas containing hydrogen, hydrogen sulfide and a carbon compound at a specified reaction temperature to reduce and carburize the iron ore and produce iron carbide; wherein
   the sulfur activity $a_s$ of sulfur contained in the reducing gas is controlled in accordance with a reaction temperature to cause iron carbide to adsorb sulfur on a surface of the iron carbide by:

measuring a partial pressure $P(H_2)$ of hydrogen and a partial pressure $P(H_2S)$ of hydrogen sulfide contained in the reducing gas;

calculating sulfur activity $a_s$ in the reducing gas from equation (1), $$a_s = (P(H_2S)/P(H_2))/(P(H_2S)/P(H_2))_E \quad (1)$$

where $(P(H_2S)/P(H_2))$ represents the ratio between the partial pressures of $H_2S$ and $H_2$ in the reducing gas and $(P(H_2S)/P(H_2))_E$ is the ratio between the partial pressures of $H_2S$ and $H_2$ in a condition where the reaction of equation (2) below is in equilibrium, $$FeS(s) + H_2(g) = Fe(s) + H_2S(g) \quad (2)$$

FeS and Fe being derived from the iron ore, where (s) and (g) represent solid and gaseous phases, respectively, and adjusting the partial pressure $P(H_2S)$ of the hydrogen sulfide in the reducing gas.

2. A method for producing iron carbide as defined in claim 1, wherein the sulfur activity $a_s$ is set at:

1.0 to 2.0 at reaction temperatures of 550° C. and above but less than 650° C.;

0.7 to 2.0 at 650° C.;

0.05 to 1.0 at over 650° C. and up to 950° C.

* * * * *